May 31, 1938.　　　H. J. THIELKER　　　2,118,953
CONTAINER
Filed Nov. 18, 1936
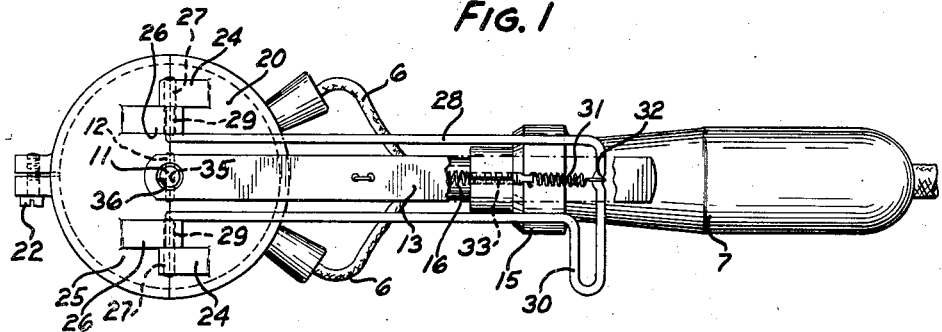
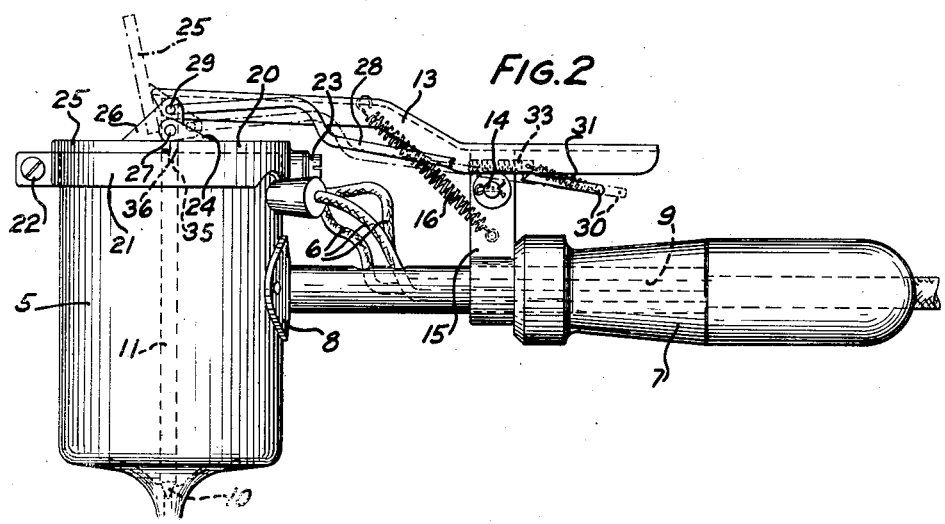
INVENTOR
H. J. THIELKER
BY H. A. Whitehorn
ATTORNEY Patented May 31, 1938

2,118,953

UNITED STATES PATENT OFFICE 2,118,953

CONTAINER

Henry J. Thielker, New York, N. Y., assignor to Western Electric Company, Incorporated, New York, N. Y., a corporation of New York Application November 18, 1936, Serial No. 111,381

6 Claims. (Cl. 221—15)

This invention relates to containers, and more particularly to self-closing covers for dispensing containers.

It is an object of the present invention to provide a simple and inexpensive container.

In accordance with one embodiment of the invention as applied to a dispensing container for sealing wax which is adapted to be heated in the container, a closure member is provided in the form of a cover controlled by a spring tensioned lever which normally tends to hold the cover closed and which is provided with an actuating arm mounted for easy access adjacent to a dispensing lever on the container handle whereby the container may be held in one hand and the cover raised with the thumb of the hand which is holding the container or the dispensing lever actuated to permit wax to flow from the container.

A better understanding of the invention will be had with reference to the following description when considered in conjunction with the accompanying drawing, wherein Fig. 1 is a plan view of a wax melting pot constructed in accordance with the present invention, parts being broken away to show more clearly the construction, and Fig. 2 is a side elevational view of the structure shown in Fig. 1.

Referring now to the drawing wherein like reference numerals indicate the same parts throughout the several views, a portable wax melting pot 5, having electrical heating elements (not shown) in the walls thereof and supplied with electricity through conductors 6—6, is provided with a handle 7 suitably attached to the melting pot 5 at 8, and having an aperture 9 extending therethrough through which the conductors 6—6 may be passed. The melting pot 5 is provided at its lower end with a spout 10 adapted to be closed by a plunger 11 pivoted at 12 to an actuating lever 13. The actuating lever is in the form of a channel shaped member pivotally mounted at 14 on a bracket 15 secured to the handle 7 and having a portion thereof extending to the right of the pivot (Figs. 1 and 2) whereby an operator, while holding the melting pot by the handle 7, may operate the lever 13 and plunger 11 with his thumb to rock the lever 13 about the pivot 14 and thereby raise the plunger 11 and permit melted wax to flow through the spout 10. A coil spring 16 secured to the lever 13 and to the bracket 15 normally tends to hold the plunger 11 in position to close the spout 10.

The plunger 11 enters the melting pot 5 through a cap 20 having a split rim 21 whereby it may be clamped upon the melting pot 5 by means of set screws 22 and 23. Extending upwardly from the cap 20 are a pair of wings 24 in which a cover plate 25 having upwardly extending lugs 26, is pivotally mounted at 27. Cooperating notches are cut in the cap and cover at 35 and 36 to form an aperture through which the plunger 11 may be moved. The upper portion (Fig. 2) of the lugs 26 are apertured to receive the ends of a forked lever 28.

The lever 28 is formed with a pair of extending ends 29—29 adapted to engage with the lugs 26, and at its right hand portion (Fig. 1) has a bent portion 30 whereby an operator holding the melting pot by the handle 7 may use the thumb of the hand in which the pot is held for actuating the lever 28. A spring 31 secured to the lever 28 in a notch 32 formed therein and having its other end secured to the bracket 15 by means of a bolt 33 normally urges the lever 28 to the left (Figs. 1 and 2) to keep the cover 25 closed.

From the foregoing description, it is believed to be apparent that an operator, while holding the melting pot 5 by the handle 7, may actuate the plunger 11 with a thumb to permit molten wax in the pot 5 to pass through the spout 10, and if it is desired to add to the supply of wax in the pot, the operator may operate the lever 28 with his thumb to move it, and the cover 25 to the position shown in dot and dash lines, whereby fresh material may be deposited in the melting pot 5. It will also be noted that the spring 31 normally holds the cover of the melting pot closed, and the spring 16 normally holds the plunger 11 in the spout 10 to prevent wax from running out of the spout.

What is claimed is:

1. In a dispensing container having a spout, a plunger for normally closing the spout, a handle for supporting the container, a lever mounted on the handle for controlling movement of the plunger, a cover pivoted on the container, and a lever mounted on the handle for opening the cover.

2. In a dispensing container having a spout, a handle for holding the container, a pair of thumb actuatable levers mounted on the handle, a spout closing plunger controlled by one of said levers, and a cover controlled by the other of said levers.

3. In a dispensing container having a spout, a handle for holding the container, a bracket mounted on said handle, a thumb operable lever pivoted on said bracket, a spout closing plunger carried by the pivoted lever, a pivoted cover on said container, and means for operating the cover including a forked member having portions thereof disposed on opposite sides of the thumb operable lever.

4. In combination with a dispensing container, a cover pivotally mounted on the container, a lever having a pair of arms pivotally connected to the cover for operating it, a spout closing plunger, and a plunger actuating lever pivotally mounted between the arms of the cover operating lever.

5. In combination with a dispensing container, a handle for holding the container, a cover pivotally mounted on the container, a lever resiliently secured to said handle and having a pair of arms pivotally connected to the cover for operating it, a spout closing plunger, and a plunger actuating lever pivotally mounted on the handle between the arms of the cover operating lever.

6. In combination with a dispensing container, a handle for holding the container, a cover pivotally mounted on the container, a lever having a pair of arms pivotally connected to the cover for operating it, a spring interconnecting the cover operating lever and the handle for normally holding the cover closed, a spout closing plunger, and a plunger actuating lever pivotally mounted on the handle between the arms of the cover operating lever.

HENRY J. THIELKER.